United States Patent Office 3,475,206
Patented Oct. 28, 1969

3,475,206
WATERPROOFING OF LEATHER AND
SYNTHETIC LEATHERS
Rudi Heyden, Dusseldorf, Germany, assignor to Bohme
Fettchemie G.m.b.H., Dusseldorf-Holthausen, Germany,
a corporation of Germany
No Drawing. Filed July 22, 1966, Ser. No. 567,079
Claims priority, application Germany, Aug. 18, 1965,
B 8,331
Int. Cl. C14c 9/00; B44d 1/32
U.S. Cl. 117—142                                     9 Claims

ABSTRACT OF THE DISCLOSURE

Compositions and method of making leather and leather substitutes waterproof and water impermeable by impregnation with an organic solution of a salt of a high molecular weight monocarboxylic acid and a basic imidazoline or pyrimidine derivative.

Objects of the invention

The invention relates to a novel method of making leathers and leather substitutes waterproof and water-impermeable and to the leathers and leather substitutes so treated.

It is an object of the invention to provide a novel method of waterproofing leather and synthetic leathers.

It is a further object of the invention to provide novel compositions for waterproofing leather and leather substitutes.

It is another object of the invention to provide novel waterproof leathers and synthetic leathers.

These and other objects and advantages of the invention will become obvious from the following detailed description.

The invention

The novel compositions of the invention for waterproofing leather and synthetic leathers are comprised of 5 to 30% by weight of a salt of a high molecular weight carboxylic acid of 10 to 21 carbon atoms and a compound of the formula,

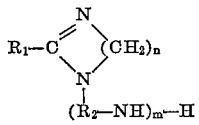

wherein $R_1$ is a hydrocarbon of 9 to 20 carbon atoms, $R_2$ is an alkylene of 2 to 3 carbon atoms, $n$ is an integer from 2 to 3 and $m$ is an integer from 1 to 3 in an organic solvent. $R_1$ may be aliphatic, aliphatic-cycloaliphatic or aliphatic-aromatic and is preferably unsaturated or branched.

The compounds of Formula I are salts of high molecular weight carboxylic acids and basic imidazoline or pyrimidine derivatives which are prepared in known manner by condensation of a carboxylic acid of 10 to 21 carbon atoms with the appropriate polyethylene polyamine or polypropylene polyamine at elevated temperatures while removing water of reaction by distillation and forming the acid salt of the resulting imidazoline or pyrimidine compounds by reaction with 0.7 to 1.3 moles, perferably 1 mole, of a high molecular weight carboxylic acid of 10 to 21 carbon atoms per mole of said heterocyclic compounds. Another method of the preparation of the salts is to use an excess of the carboxylic acid in the condensation step.

Examples of suitable polyethylene polyamines and polypropylene polyamines for the formation of the condensation product are diethylene triamine, triethylene tetramine, tetraethylene pentamine, dipropylene triamine, etc. The polyamines preferably have 2 to 5 nitrogen atoms.

Examples of suitable carboxylic acids of 10 to 21 carbon atoms for the formation of the condensation products are fatty acids derived from natural fats and oils such as lauric acid, palmitic acid, oleic acid, ricinoleic acid, linoleic acid, etc.; mixtures of fatty acids derived from natural fats and oils such as coconut oil fatty acids and train oil fatty acids having 10 to 18 carbon atoms, acids derived from cottonseed oil, teaseed oil, sperm oil, tallow, etc.; resinic acids; montanic acids; branched carboxylic acids resulting from the oxidation of branched paraffins, etc. Particularly preferred are high molecular weight fatty acids having an unsaturated or branched hydrocarbon chain and fatty acid mixtures containing said acids. The said acids can also be used to form the carboxylic acid salts of the imidazoline or pyrimidine derivatives.

Examples of suitable organic solvents for the low viscosity compositions of the invention are lower aliphatic hydrocarbons and alcohols, aromatic hydrocarbons and alcohols and chlorinated derivatives thereof. The said salts are easily soluble in the organic solvents and are practically insoluble in water. However, in the presence of water they swell up considerably.

Examples of specific salts for waterproofing leather and leather substitutes are the condensation product of diethylene triamine and oleic acid neutralized with oleic acid; the condensation product of tetraethylene pentamine and fatty acids derived from train oil neutralized with oleic acid; the condensation product of triethylene tetraamine and linoleic acid neutralized with branched fatty acids of 15 to 19 carbon atoms formed by oxidation of oxo-alcohols; the condensation product of 1 mole of triethylene tetramine and 2.3 moles of coconut oil fatty acids; and the condensation product of dipropylene triamine and coconut fatty acids of 10 to 18 carbon atoms neutralized with the said coconut fatty acids.

All types of leather such as chrome-tanned and vegetable tanned leathers and imitation leathers such as leatherette produced from leather scraps, porous synthetics having the characteristics of leather and other porous or fibrous materials used as leather substitutes can be treated with the compositions of the invention.

The method of the invention comprises impregnating the leather and leather substitutes with a sufficient amount of the compositions of the invention so that there is 3 to 12% by weight of the leather of the said salts present in the treatment. The impregnation may be effected by immersing the leather in the organic solutions or by spreading, brushing or spraying the said salts, preferably in an organic solution upon the leather and leather substitute. Since the alcoholic solutions retain their low viscosity in the presence of small quantities of water, satisfactory impregnation effects can be achieved by means of fullering the alcoholic solutions into the still moist leather in the tanning vat.

Numerous processes for rendering leather water-repellent have already been suggested, but experience has proved that these processes do not meet the requirements of the practice, in particular when, as in the case with shoes, water is pressed with great force through the pores of the leather. Also insufficient are all methods whereby the pores of the leather become clogged which causes loss of the characteristics of leather and air-and-water-vapor exchange is interrupted. In comparison, the porosity of the leather processed according to the invention is retained in dry condition and the condensation products act in this case as lubricating and softening agents for the leather. Only at the admission of moisture do the pores become closed and the leather, consequently, becomes water-impermeable. Due to the water-insolubility of the products, the impregnation effect is retained even after repeated moisture-exposure.

In the following examples there are described several preferred embodiments to illustrate the invention. However, it should be understood that this invention is not intended to be limited to the specific embodiments.

EXAMPLE I 73.0 parts by weight of triethylenetetramine and 142 parts by weight of oleic acid were heated to 220° C. with stirring. At 140° C., water began to form and 10 parts by weight of water were removed by distillation. After the reaction was completed, 284 parts by weight of oleic acid were added to the reaction mixture with stirring to neutralize the basic condensation product to obtain product A.

70.5 parts by weight of oleic acid and 26.0 parts by weight of diethylenetriamine were heated to a temperature of 220° C. as for product A and 5 parts by weight of water were distilled off. The condensation product was neutralized with 70.5 parts by weight of oleic acid to obtain product B.

70.5 parts by weight of oleic acid and 36.5 parts by weight of triethylenetetramine were heated 220° C. as for product A. The condensation product was neutralized with 137 parts by weight of a mixture of branched chain carboxylic acids having 15 to 19 carbon atoms formed by oxidation of oxo alcohols to obtain product C.

Chrome-tanned and fat-liquored leather samples were immersed for 10 minutes in a solution of 4 parts by weight of isopropanol, 5 parts by weight of benzine (boiling point—110 to 140° C.) and 1 part by weight of each of the above products. After the leather was air-dried, it was further dried for an hour at 80° C. and then the water-repellent properties of the leather samples were determined in the Maeser machine. The results are summarized in Table I and they show the water-repellent properties of the leather treated by the invention.

TABLE I

| Product: | Water-penetration after, bends |
|---|---|
| Blank test | 100 |
| A | 40,000 |
| B | 50,000 |
| C | 9,800 |

EXAMPLE II

The test solutions of products A, B, and C of Example I were sprayed onto chrome-tanned leather with a spray gun. After being air-dried and climatized, the leather had an increase of about 9% in weight. The water-repellent properties of the leather samples were then determined on the Maeser machine and the results are summarized in Table II.

TABLE II

| | Water penetration after— | Percent of water-absorption after 10,000 bends |
|---|---|---|
| Products: | | |
| Blank Test | 120 bends | 89 |
| A | 59,000 bends | 19 |
| B | 90,000 bends | 13 |
| C | 76,000 bends | 25 |

EXAMPLE III

Commercial, vegetable-tanned bottom leather was immersed in the solutions of products A and B of Example I for 10 minutes and then dried overnight and dried at 46° C. for 1 hour. After the leather had been climatized, the resistance of the leather to water penetration was determined in the Bally Permeometer and the results are summarized in Table III.

TABLE III

| | Water penetration (in minutes) | Water permeability in gm. (after 1 hour) |
|---|---|---|
| Product: | | |
| Blank Test | 4 | 2.4 |
| A | 320 | |
| B | 360 | |

Similar results were obtained with a solution of a condensation product of 1 mole of train oil fatty acids of 12 to 20 carbon atoms and 1 mole of tetraethylene pentaamine neutralized with a dimer of oleic acid in place of products A and B.

EXAMPLE IV

In a tanning vat, vegetable-tanned leather, without solution but still in a moist condition, was admixed with 10% by weight of the leather of a 50% solution of product A of Example I in isopropanol and the leather was then fullered for 1 hour at a temperature of 35° C. After drying and climatizing, the water resistance of the leather was determined in the Bally Permeometer and the results are summarized in Table IV.

TABLE IV

| | Water penetration in minutes | Water absorption (after 1 hr.) | Water-impermeability (after 1 hr.) |
|---|---|---|---|
| Product: | | | |
| Blank Test | 1 | 93 | 5.7 |
| A | 66 | 51 | 0.6 |

I claim:
1. A method of waterproofing leather and leather substitutes which comprises impregnating leather and leather substitutes with an organic solution of 5 to 30% by weight of a salt of a high molecular weight monocarboxylic acid of 10 to 21 carbon atoms and a basic compound of the formula

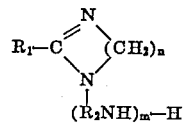

wherein $R_1$ is a hydrocarbon radical of 9 to 20 carbon atoms, $R_2$ is an alkylene of 2 to 3 carbon atoms, $m$ is an integer from 1 to 3 and $n$ is an integer from 2 to 3.

2. The method of claim 1 wherein the high molecular weight mono-carboxylic acid is an unsaturated fatty acid.

3. The method of claim 1 wherein the high molecular weight mono-carboxylic acid is a branched chain fatty acid.

4. The method of claim 1 wherein the said salt is used in 5 to 50% concentration in an organic solvent selected from the group consisting of lower alkyl alcohols and liquid aliphatic and aromatic hydrocarbons.

5. The method of claim 1 wherein $R_2$ is ethylene.

6. The method of claim 1 wherein $R_2$ is propylene.

7. The method of claim 1 wherein $n$ is 2.

8. The method of claim 1 wherein $n$ is 3.

9. Waterproof leather and synthetic leather prepared according to the process of claim 1.

References Cited

UNITED STATES PATENTS 3,138,610  6/1964  Buc et al. _____ 252—8.57 X
3,019,133  1/1962  Heydon et al. _____ 252—8.57 X MAYER WEINBLATT, Primary Examiner G. I. GLUCK, Assistant Examiner U.S. Cl. X.R.

8—94.18; 106—2; 161—226; 252—8.57